United States Patent
Flynn et al.

(10) Patent No.: US 9,282,036 B2
(45) Date of Patent: *Mar. 8, 2016

(54) DIRECTED ROUTE LOAD/STORE PACKETS FOR DISTRIBUTED SWITCH INITIALIZATION

(71) Applicant: International Business Machines Corporation, Armonk, NY (US)

(72) Inventors: William T. Flynn, Rochester, MN (US); Joseph A. Kirscht, Rochester, MN (US); Bruce M. Walk, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 65 days.

This patent is subject to a terminal disclaimer.

(21) Appl. No.: 13/772,018

(22) Filed: Feb. 20, 2013

(65) Prior Publication Data

US 2014/0233579 A1   Aug. 21, 2014

Related U.S. Application Data

(63) Continuation of application No. 13/771,670, filed on Feb. 20, 2013.

(51) Int. Cl.
*H04L 12/721* (2013.01)

(52) U.S. Cl.
CPC ............... *H04L 45/72* (2013.01); *H04L 45/44* (2013.01); *H04L 45/66* (2013.01); *H04L 45/34* (2013.01); *H04L 45/566* (2013.01)

(58) Field of Classification Search
USPC ......... 370/225, 290, 380, 386, 390, 392, 393, 370/396, 400, 401; 709/230, 233
See application file for complete search history.

(56) References Cited

U.S. PATENT DOCUMENTS

| 4,631,534 | A | 12/1986 | Franklin et al. |
| 5,134,610 | A | 7/1992 | Shand et al. |

(Continued)

FOREIGN PATENT DOCUMENTS

| JP | 03273727 A | 12/1991 |
| JP | 11341060 A | 12/1999 |
| JP | 2011166692 A | 8/2011 |

OTHER PUBLICATIONS

U.S. Appl. No. 13/771,670 entitled "Directed Route Load/Store Packets for Distributed Switch Initialization,", filed Feb. 20, 2013.

(Continued)

*Primary Examiner* — Edan Orgad
*Assistant Examiner* — Saumit Shah
(74) *Attorney, Agent, or Firm* — Patterson & Sheridan, LLP

(57) ABSTRACT

Techniques are described for transmitting a packet from a source switch module to a destination switch module. Embodiments receive, at the source switch module, from the destination switch module, path information specifying a path from the source switch module to the destination switch module. Upon detecting an occurrence of a predefined event, a packet is generated that includes (i) the received path information and (ii) payload data to be processed at the destination switch module. Embodiments determine an Ethernet port of the source switch module on which to transmit the packet, based on the received path information. The packet is transmitted to a second switch module using the determined Ethernet port.

18 Claims, 10 Drawing Sheets

(56) References Cited

U.S. PATENT DOCUMENTS

| | | | |
|---|---|---|---|
| 5,237,565 A | 8/1993 | Henrion et al. | |
| 5,608,720 A | 3/1997 | Biegel et al. | |
| 6,081,506 A | 6/2000 | Buyukkoc et al. | |
| 6,185,214 B1 | 2/2001 | Schwartz et al. | |
| 6,198,747 B1 | 3/2001 | Bingham et al. | |
| 6,246,680 B1 | 6/2001 | Muller et al. | |
| 6,331,983 B1 | 12/2001 | Haggerty et al. | |
| 6,487,177 B1 | 11/2002 | Weston-Dawkes | |
| 6,618,373 B1 * | 9/2003 | Subramaniam | 370/390 |
| 6,697,359 B1 | 2/2004 | George | |
| 6,934,283 B1 * | 8/2005 | Warner | 370/380 |
| 6,952,421 B1 | 10/2005 | Slater | |
| 7,046,668 B2 | 5/2006 | Pettey et al. | |
| 7,093,027 B1 | 8/2006 | Shabtay et al. | |
| 7,188,209 B2 | 3/2007 | Pettey et al. | |
| 7,219,183 B2 | 5/2007 | Pettey et al. | |
| 7,221,676 B2 | 5/2007 | Green et al. | |
| 7,372,843 B1 | 5/2008 | Asawa et al. | |
| 7,457,906 B2 | 11/2008 | Pettey et al. | |
| 7,461,130 B1 | 12/2008 | AbdelAziz et al. | |
| 7,477,657 B1 | 1/2009 | Murphy et al. | |
| 7,525,968 B1 | 4/2009 | Dropps et al. | |
| 7,599,283 B1 | 10/2009 | Varier et al. | |
| 7,613,816 B1 | 11/2009 | Dropps et al. | |
| 7,746,872 B2 | 6/2010 | Norden | |
| 7,774,440 B1 | 8/2010 | Bagrodia et al. | |
| 7,788,522 B1 | 8/2010 | Abdelaziz et al. | |
| 8,149,834 B1 | 4/2012 | Nielsen et al. | |
| 8,194,534 B2 | 6/2012 | Pandey et al. | |
| 8,396,022 B1 | 3/2013 | Lindsay et al. | |
| 8,842,523 B2 | 9/2014 | Engebretsen et al. | |
| 8,848,517 B2 | 9/2014 | Engebretsen et al. | |
| 2001/0019554 A1 | 9/2001 | Nomura et al. | |
| 2001/0050915 A1 | 12/2001 | O'Hare et al. | |
| 2002/0013847 A1 | 1/2002 | Fisher et al. | |
| 2002/0067731 A1 | 6/2002 | Houston et al. | |
| 2002/0150088 A1 | 10/2002 | Yoshino et al. | |
| 2003/0120715 A1 | 6/2003 | Johnson et al. | |
| 2003/0204273 A1 | 10/2003 | Dinker et al. | |
| 2004/0028038 A1 | 2/2004 | Anderson et al. | |
| 2004/0260842 A1 | 12/2004 | Pettey et al. | |
| 2005/0094568 A1 | 5/2005 | Judd | |
| 2005/0094630 A1 | 5/2005 | Valdevit | |
| 2005/0102437 A1 | 5/2005 | Pettey et al. | |
| 2005/0147117 A1 | 7/2005 | Pettey et al. | |
| 2005/0268137 A1 | 12/2005 | Pettey | |
| 2006/0002304 A1 | 1/2006 | Ashwood-Smith | |
| 2006/0077974 A1 | 4/2006 | Goossens et al. | |
| 2006/0198356 A1 | 9/2006 | Mayernick | |
| 2007/0115964 A1 | 5/2007 | Srinivasan et al. | |
| 2007/0297406 A1 | 12/2007 | Rooholamini | |
| 2008/0126649 A1 | 5/2008 | George | |
| 2008/0148010 A1 | 6/2008 | Kodama | |
| 2008/0285562 A1 | 11/2008 | Scott et al. | |
| 2009/0109967 A1 | 4/2009 | Banerjee et al. | |
| 2009/0265449 A1 | 10/2009 | Krishnappa et al. | |
| 2009/0285128 A1 | 11/2009 | Swan | |
| 2010/0095020 A1 * | 4/2010 | Rixner et al. | 709/233 |
| 2011/0085557 A1 | 4/2011 | Gnanasekaran et al. | |
| 2011/0090804 A1 | 4/2011 | Wusirika | |
| 2011/0222534 A1 | 9/2011 | Kurita | |
| 2011/0273980 A1 * | 11/2011 | Ashwood Smith | 370/225 |
| 2011/0286326 A1 | 11/2011 | Awano | |
| 2011/0289344 A1 | 11/2011 | Bae et al. | |
| 2012/0044944 A1 | 2/2012 | Kotha et al. | |
| 2012/0051232 A1 | 3/2012 | Nomura | |
| 2012/0099602 A1 | 4/2012 | Nagapudi et al. | |
| 2012/0143892 A1 | 6/2012 | Fried et al. | |
| 2012/0188865 A1 | 7/2012 | Michaelis et al. | |
| 2014/0003249 A1 | 1/2014 | Cai | |
| 2014/0086044 A1 | 3/2014 | Engebretsen et al. | |
| 2014/0086051 A1 | 3/2014 | Engebretsen et al. | |
| 2014/0229602 A1 | 8/2014 | Engebretsen et al. | |
| 2014/0233566 A1 | 8/2014 | Flynn et al. | |
| 2014/0233578 A1 | 8/2014 | Flynn et al. | |
| 2014/0269692 A1 | 9/2014 | Flynn et al. | |
| 2014/0269693 A1 | 9/2014 | Flynn et al. | |
| 2014/0269694 A1 | 9/2014 | Flynn et al. | |
| 2015/0103833 A1 | 4/2015 | Flynn et al. | |
| 2015/0103834 A1 | 4/2015 | Flynn et al. | |
| 2015/0139239 A1 | 5/2015 | Flynn et al. | |

OTHER PUBLICATIONS

U.S. Application entitled "Directed Route Load/Store Packets for Distributed Switch Initialization,", filed Feb. 20, 2013.

* cited by examiner

US 9,282,036 B2

DIRECTED ROUTE LOAD/STORE PACKETS FOR DISTRIBUTED SWITCH INITIALIZATION

CROSS-REFERENCE TO RELATED APPLICATIONS

This application is a continuation of co-pending U.S. patent application entitled "DIRECTED ROUTE LOAD/STORE PACKETS FOR DISTRIBUTED SWITCH INITIALIZATION", Ser. No. 13/771,670, filed Feb. 20, 2013. The aforementioned related patent application is herein incorporated by reference in its entirety.

BACKGROUND

The present invention relates to computer networking, and more specifically, to techniques for reacting to events within a distributed switch module using a set of predefined load/store operations.

Computer systems often use multiple computers that are coupled together in a common chassis. The computers may be separate servers that are coupled by a common backbone within the chassis. Each server may be a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

Additionally, the switch itself may be a distributed system. For example, the distributed switch may include a plurality of switch modules and one or more control modules. Generally, the switch modules may each include a respective set of ports and could be configured to act as independent sub-switches. The control module(s) could provide control plane logic for the plurality of switch modules, and the control module(s) may be shared by the plurality of switch modules. One advantage to such a distributed switch is that distributed systems can oftentimes grow larger than conventional systems at less cost. Additionally, distributed systems are frequently more modular then conventional systems, allowing faulty, individual components to be isolated and replaced in a more efficient and inexpensive fashion.

SUMMARY

Embodiments provide a method, computer-readable storage and system for transmitting a packet from a source switch module to a destination switch module. The method, computer-readable storage and system include receiving, at the source switch module, from the destination switch module, path information specifying a path from the source switch module to the destination switch module. Additionally, the method, computer-readable storage and system include, upon detecting an occurrence of a predefined event, generating a packet that includes (i) the received path information and (ii) payload data to be processed at the destination switch module. The method, computer-readable storage and system further include determining an Ethernet port of the source switch module on which to transmit the packet, based on the received path information. The method, computer-readable storage and system also include transmitting the packet to a second switch module using the determined Ethernet port.

DETAILED DESCRIPTION

Figure 1:
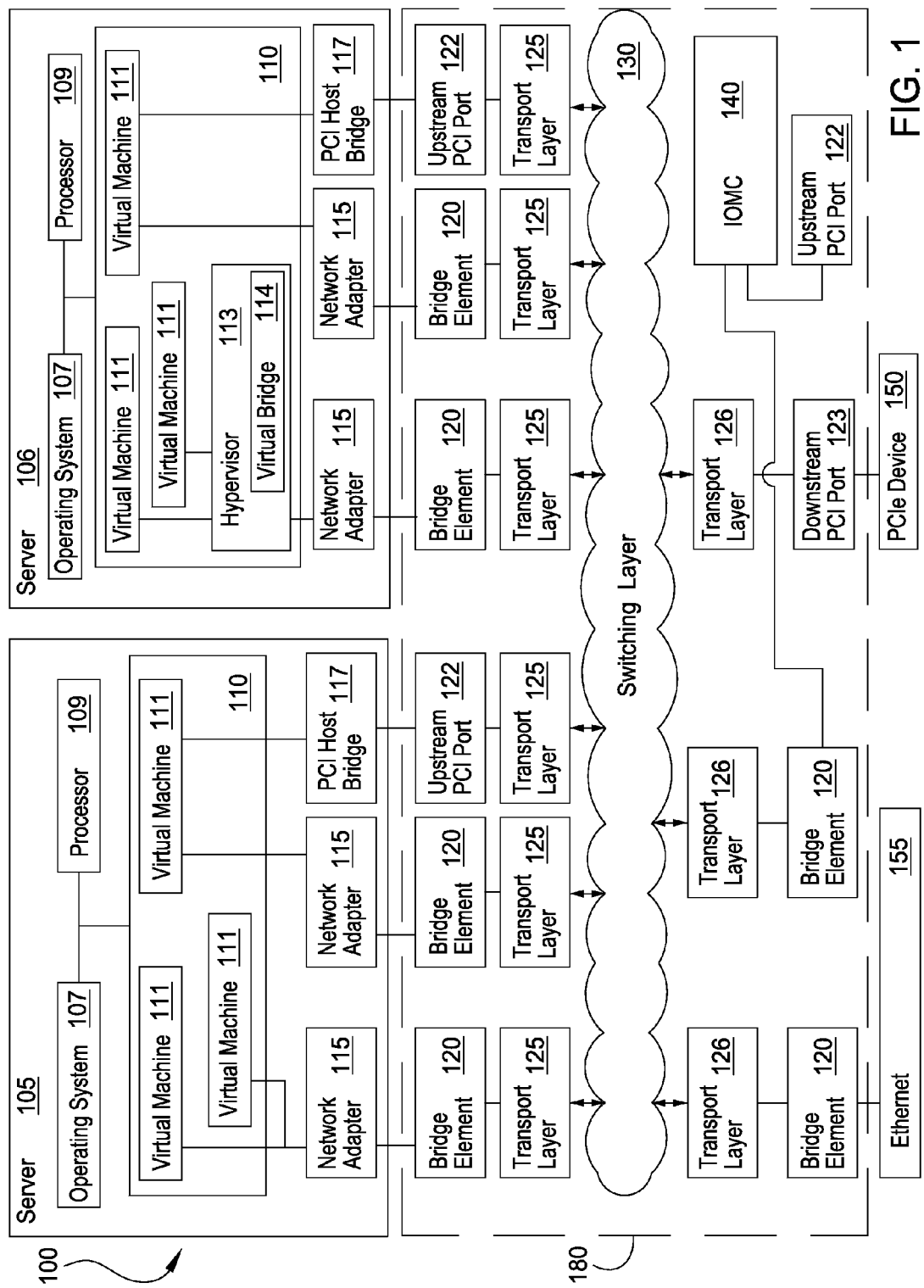
FIG. 1 illustrates a system architecture that includes a distributed, virtual switch, according to one embodiment described herein.

Generally, a distributed, virtual switch may include a plurality of switch modules, each of which contains a set of ports and logic to direct traffic between the ports. The distributed switch may also include one or more control modules (also referred to herein as a "switch management controller"), which provide control plane logic for the plurality of switch modules and are shared by the plurality of switch modules. Doing so can allow distributed switches to scale to larger sizes for less cost than conventional switches.

In some circumstances, it may be desirable for a controller to direct the actions of individual switch modules within a distributed switch. As an example, a controller could direct a switch module's actions in order to configure the communication links of the switch module. However, before the links of the switch module within the distributed switch are configured, the controller may be unable to communicate with the switch module using Ethernet communications. In such a situation, an administrator may be required to directly connect to the switch module in order to configure the links of the switch module manually.

As such, embodiments provide techniques for transmitting a packet from a source switch module to a destination switch module. Here, a payload of the management packet may include a set of load/store operations which are to be executed by the destination switch module. For example, a controller could transmit a management packet to a particular switch module within the distributed switch, which contains a set of load/store operations which, when executed, are configured to configure the links of the switch module.

For instance, the controller could retrieve path information specifying a route from the controller through the distributed switch to the destination switch module. The controller could then create a packet that includes at least a portion of the path information. For example, the packet could include a list of link IDs that are used to transmit the packet from the controller to the destination switch module. As an example, the created packet could contain the ports "5, 2, 3", indicating that the controller will transmit the packet to a first switch module using the controller's link with link ID "5", the first switch module will transmit the packet to a second switch module using the first switch module's link with link ID "2", and the second switch module will transmit the packet to the destination switch module using the second switch module's link with link ID "3".

Additionally, the created packet could contain a set of load/store operations to be executed by the destination switch module. As discussed above, the set of load/store operations could be a set of operations which, when executed, are configured to configure the Ethernet communication links of the destination switch module. The created packet is then transmit to another switch module within the distributed switch. Here, the packet could be transmitted using a link on the controller unit that is determined based on the retrieved path information. For example, the path information could specify that the packet should be transmitted using the controller's link having link ID "5".

The packet could then be received by an intermediary switch module within the distributed switch. Generally, an "intermediary switch module" refers to any switch module within the distributed switch along a particular path between a source (e.g., the controller) and a destination switch module. Upon receiving the packet, logic on the intermediary switch module could determine an identifier (e.g., a link ID) of the link of the intermediary switch module on which the packet was received. The logic could then insert the determined identifier into the packet, for use in transmitting an acknowledgement message back to the source (e.g., the controller) once the set of load/store operations have been executed by the destination switch module.

For instance, as the packet passes through the intermediary switch module(s) towards the destination switch module, each intermediary switch module could insert a respective link identifier into the packet. Once the destination switch module has received the packet and executed the set of load/store operations, the packet could then be passed back through the intermediary switch modules to the source (e.g., the controller). Each intermediary switch module could then use the link identifier that the intermediary switch module previously inserted into the packet to select which link to transmit the packet on. Thus, for example, if an intermediary switch module initially received the packet on its link having a link ID of "3", the intermediary switch module could then transmit the acknowledgement message back to the source using the link having a link ID of "3".

Once the link identifier is inserted into the packet, the intermediary switch module accesses the path information within the packet that specifies the route to the destination switch module. The intermediary switch module could then use the path information to determine how to transmit the packet towards the destination switch module. For instance, the path information could include a list of link identifiers to be used in transmitting the packet to the destination switch module. As an example, assume that the packet contains path information specifying the link IDs "5, 2, 3". The intermediary switch module could then determine which of these links to use, and could then forward the packet on the corresponding link. For example, the path information could also include a switch ID field, which is incremented each time the packet is forwarded to a switch module. In such an embodiment, the switch ID field could be used as an index to the list of link IDs to determine which link the current switch module should use. For example, if the intermediary switch module determines the switch ID is "1", the intermediary switch module could use this value as an index to the set of link IDs and could determine that link "2" should be used to forward the packet on towards the destination switch module. The intermediary switch module could then transmit the packet on the determined link.

Generally speaking, the packet may go through any number of intermediary switch modules before ultimately reaching the destination switch module. The destination switch module, upon receiving the packet, could copy the set of load/store operations within the packet into an execution buffer on the destination switch module. The execution buffer generally refers to some area of memory on a switch module (or accessible by the switch module) that is configured to store one or more load/store operations for execution. For example, the execution buffer could be an array object on the switch module and logic on the switch module could be configured to monitor the array to determine when load/store operations are copied into the array for execution. Upon detecting one or more load/store operations within the array, the logic could automatically execute the load/store operations (e.g., in an order based on the order the load/store operations are stored in the array).

Once the load/store operations are executed, the destination switch module could transmit an acknowledgement message back to the source, using the link information inserted into the packet by the intermediary switch modules. In one embodiment, the packet itself is transmitted back to the source as the acknowledgement message. Upon receiving the acknowledgement message, the source could conclude that the packet was successfully received by the destination switch module and that the set of load/store operations within the packet were successfully executed by the destination switch module.

These techniques for transmitting a management packet to a remote switch module are discussed in more detail in Section II below. However, Section I first describes an exemplary environment in which embodiments may be implemented. Of note, while embodiments may be implemented in the distributed switch environment described in Section I, such an environment is provided for illustrative purpose only and without limitation. Moreover, it is broadly contemplated that embodiments may implemented in any switch or network environment, consistent with the functionality described herein.

I. Distributed Switch Infrastructure

A distributed, virtual switch may appear as a single switch element to a computing system (e.g., a server) connected to the distributed switch. In reality, the distributed switch may include a plurality of different switch modules that are interconnected via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). Moreover, each of the switch modules may be configured to accept and route data based on two different communication protocols. To the computing system, however, the two separate switch modules appear to be one single switch.

The distributed switch may include a plurality of chips (i.e., sub-switches) on each switch module. These sub-switches may receive a multicast data frame (e.g., an Ethernet frame) that designates a plurality of different destination sub-switches. The sub-switch that receives the data frame is responsible for creating copies of a portion of the frame, such as the frame's payload, and forwarding that portion to the respective destination sub-switches using the fabric of the distributed switch. However, instead of simply using one egress connection interface to forward the copies of the data frame to each of the destinations sequentially, the sub-switch may use a plurality of connection interfaces to transfer copies of the data frame in parallel. For example, a sub-switch may have a plurality of Tx/Rx ports that are each associated with a connection interface that provides connectivity to the other sub-switches in the distributed switch. The port that receives the multicast data frame can borrow the connection interfaces (and associated hardware) assigned to these other ports to transmit copies of the multicast data frame in parallel.

In addition, these sub-switches may be arranged in a hierarchical structure where one or more sub-switches are selected to act as surrogates. The sub-switches of the distributed switch are grouped together where each group is assigned to one or more of the surrogates. When a sub-switch receives a multicast data frame, it forwards the packet to one of the surrogate sub-switches. Each surrogate sub-switch may then forward the packet to another surrogate or to a destination sub-switch. Because the surrogates may also transmit the packets in parallel using two or more connection interfaces, the bandwidth used to forward the multicast packet increases for each surrogate used.

Further, the surrogate hierarchy may be configured to be compatible with link aggregation where multiple physical connections are grouped together to create an aggregated (logical) link. Link aggregation requires similar data frames to use the same data path when traversing the distributed switch. With a unicast data frame, the sub-switch that receives the data frame typically identifies the destination port (based on a hash key) and forwards the data frame to the sub-switch with that port. However, with multicast data frames, it may be impossible to store information about every port in the distributed switch on each sub-switch. Instead, the sub-switch that receives the multicast data frame may not identify the destination port but instead forward the multicast data according to the hierarchy.

In one embodiment, the multicast data is forwarded to at least two sub-switches that each have at least one local port that belongs to the same aggregated link. Because the Link Aggregation Protocol permits only one of these local ports to be the selected port, each sub-switch performs link selection using the same hash value to determine if its local port is the selected port. If the local port is the selected port, the sub-switch transmits the multicast data frame using the selected port. If not, the sub-switch disregards the multicast data.

In another embodiment, only one port is enabled for each aggregated link in a multicast group. The multicast data traverses the surrogate hierarchy until it reaches the sub-switch with the enabled port. The sub-switch then performs link selection to determine which of the ports in the trunk is the selected port. If the selected port is the local enabled port on the sub-switch, then the sub-switch uses that port to transmit the multicast data. If not, the sub-switch determines which port in the aggregated link is the selected port and forwards the multicast data to the sub-switch that contains the selected port.

In another embodiment, link selection is never performed. Like in the previous embodiment, in this embodiment, only one port is enabled for each aggregated link in a multicast group. The multicast data traverses the surrogate hierarchy until it reaches the sub-switch with the enabled port. However, the sub-switch never uses the hash value to determine which of the ports in the aggregated link is the selected port. Instead, all the multicast traffic for that aggregated link in the MC group is transmitted through the enabled port rather than being dispersed across the different ports of the aggregated link based on the hash key.

FIG. 1 illustrates a system architecture that includes a distributed virtual switch, according to one embodiment described herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111. The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement of Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge 117 would then connect to an upstream PCI port 122 on a switch element in the distributed switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect with dedicated connections which connect bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

Although "upstream" and "downstream" are used to describe the PCI ports, this is only used to illustrate one possible data flow. For example, the downstream PCI port 123 may in one embodiment transmit data from the connected to the PCIe device 150 to the upstream PCI port 122. Thus, the PCI ports 122, 123 may both transmit as well as receive data.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
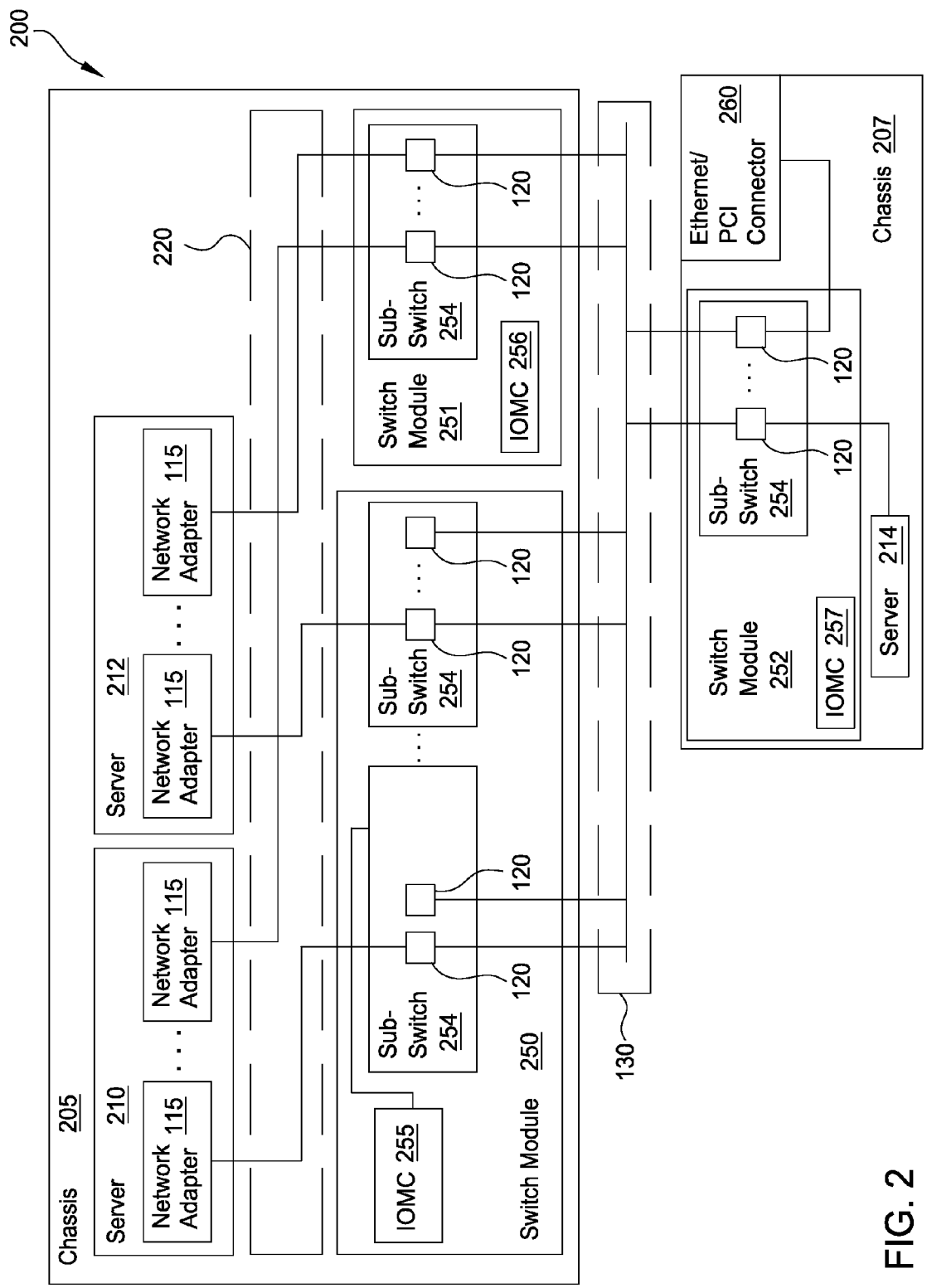
FIG. 2 illustrates the hardware representation of a system that implements a distributed, virtual switch, according to one embodiment described herein.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254 (i.e., a microchip). In one embodiment, the switch modules 250, 251, 252 are hardware components (e.g., PCB boards, FPGA boards, etc.) that provide physical support and connectivity between the network adapters 115 and the bridge elements 120. In general, the switch modules 250, 251, 252 include hardware that connects different chassis 205, 207 and servers 210, 212, 214 in the system 200 and may be a single, replaceable part in the computing system.

The switch modules 250, 251, 252 (e.g., a chassis interconnect element) include one or more sub-switches 254 and an IOMC 255, 256, 257. The sub-switches 254 may include a logical or physical grouping of bridge elements 120—e.g., each sub-switch 254 may have five bridge elements 120. Each bridge element 120 may be physically connected to the servers 210, 212. For example, a bridge element 120 may route data sent using either Ethernet or PCI communication protocols to other bridge elements 120 attached to the switching layer 130 using the routing layer. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

The dotted line in chassis 205 defines the midplane 220 between the servers 210, 212 and the switch modules 250, 251. That is, the midplane 220 includes the data paths (e.g., conductive wires or traces) that transmit data between the network adapters 115 and the sub-switches 254.

Each bridge element 120 connects to the switching layer 130 via the routing layer. In addition, a bridge element 120 may also connect to a network adapter 115 or an uplink. As used herein, an uplink port of a bridge element 120 provides a service that expands the connectivity or capabilities of the system 200. As shown in chassis 207, one bridge element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridge elements 120 to update the routing tables and lookup tables to include the hardware elements on the new switching module.

Figure 3:
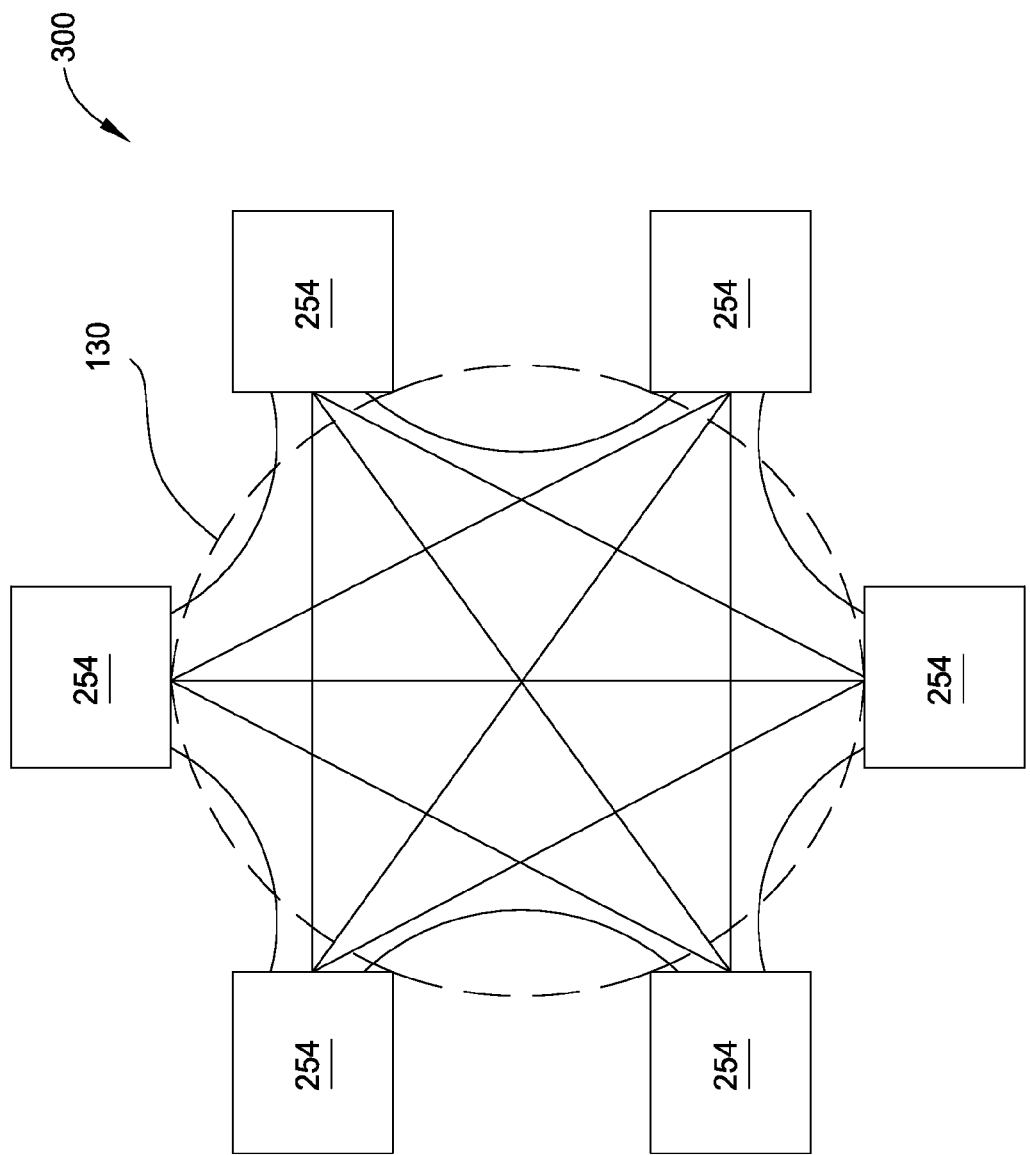
FIG. 3 illustrates a distributed, virtual switch, according to one embodiment described herein.

FIG. 3 illustrates a virtual switching layer, according to one embodiment described herein. As shown in the system 300, each sub-switch 254 in the systems 100 and 200 is connected to the other sub-switches 254 using the switching layer 130 via a mesh connection schema. That is, no matter the sub-switch 254 used, a cell (i.e., data packet) can be routed to another other sub-switch 254 located on any other switch module 250, 251, 252. This may be accomplished by directly connecting each of the bridge elements 120 of the sub-switches 254—i.e., each bridge element 120 has a dedicated data path to every other bridge element 120.

Figure 4:
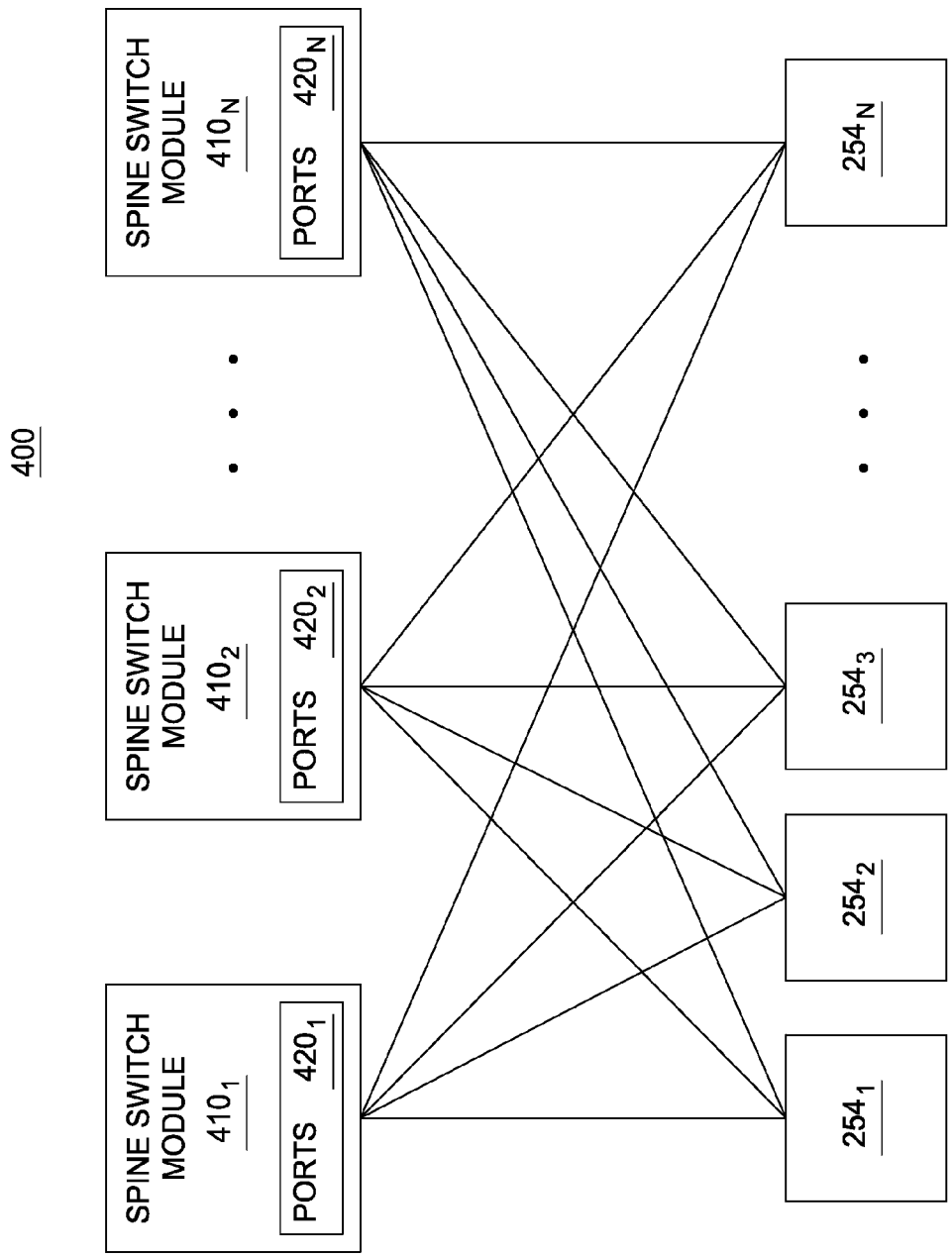
FIG. 4 illustrates a distributed, virtual switch, according to one embodiment described herein.

Alternatively, the switching layer 130 may use a spine-leaf architecture where each sub-switch 254 (i.e., a leaf node) is attached to at least one spine node. The spine nodes route cells received from the sub-switch 254 to the correct spine node which then forwards the data to the correct sub-switch 254. An example of this configuration is shown in FIG. 4, which illustrates a distributed, virtual switch, according to one embodiment described herein. Generally, the sub-switches $254_{1-N}$ may reside in one or more switch modules (e.g., switch modules 250, 251, 252). As shown in the system 400, each of the sub-switches $254_{1-N}$ is connected to each of the spine switch modules $410_{1-N}$ using the respective set of ports $410_{1-N}$. Thus, each of the sub-switches $254_{1-N}$ could communicate with each of the other sub-switches $254_{1-N}$ via a spine-leaf connection schema. Additionally, although the system 400 illustrates a two-level spine-leaf configuration, other configurations could additional hierarchical levels of spine switch modules. For instance, a third level of spine switch modules could be provided above the depicted spine switch modules $410_{1-N}$, and the depicted spine switch modules $410_{1-N}$ could communicate with one another using the third level of spine switch modules.

Advantageously, increasing the number of hierarchical levels employed in the spine-leaf configuration allows the distributed switch to scale to larger sizes, without requiring individual switch modules (e.g., sub-switches $254_{1-N}$ and spine switch modules $410_{1-N}$) to have an increased number of ports. Such configurations may result in a relatively low cost distributed switch solution that includes a large quantity of inexpensive, low-port switch modules. However, such examples are without limitation and are provided for illustrative purposes only. Moreover, embodiments are not limited to any particular technique for interconnecting the sub-switches 254.

II. Data Packet Control Component

Figure 5:
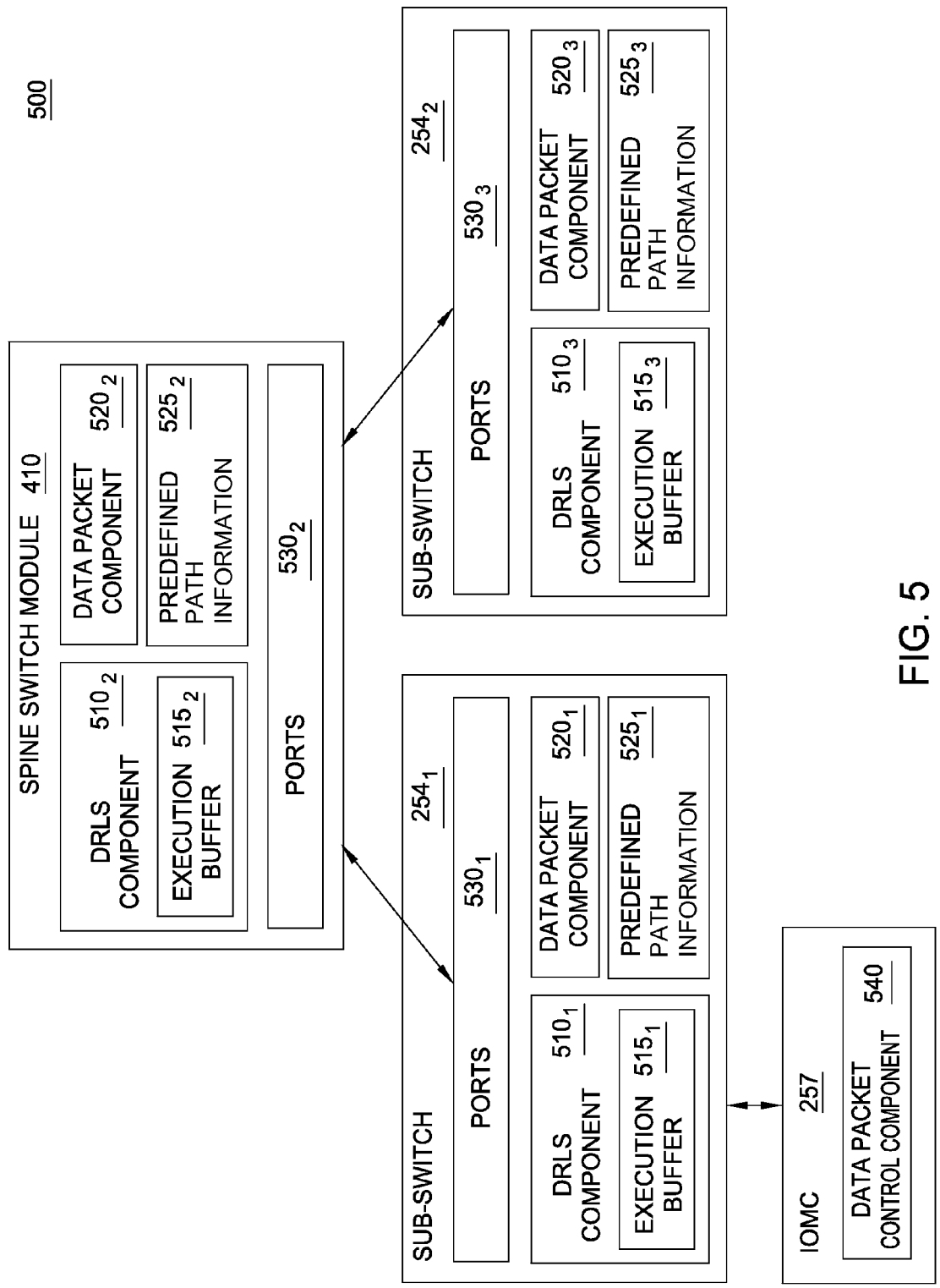
FIG. 5 illustrates a distributed, virtual switch configured with a data packet control component, according to one embodiment described herein.

As discussed above, embodiments provide techniques for reacting to events in a switch module. FIG. 5 illustrates a distributed, virtual switch configured with a DRLS component, according to one embodiment described herein. As an initial note, although the system 500 illustrates a spine-leaf configuration for the distributed switch, as discussed above other configurations may be employed (e.g., the mesh connection schema in the system 300).

As shown, the system 500 includes sub-switch modules $254_{1-2}$ and a spine switch module 410. The system 500 also includes an IOMC 257 communicatively coupled to the sub-switch $254_1$. As discussed above, the IOMC 257 generally provides the control plane logic for each of the switch modules $254_{1-2}$ and 410. Additionally, each of the switch modules $254_{1-2}$ and 410 contains a respective set of ports $530_{1-3}$, a directed-route load/store (DRLS) component $510_{1-3}$, a data packet component $520_{1-3}$, and predefined path information $525_{1-3}$. Additionally, each of the DRLS components $510_{1-3}$ contains an execution buffer $515_{1-3}$. As discussed above, each of the DRLS components $510_{1-3}$ may be configured to detect when load/store operations have been copied into their respective execution buffer $515_{1-3}$ and, upon detecting the respective execution buffer $515_{1-3}$ contains load/store operations, to execute the contents of the respective execution buffer $515_{1-3}$.

As shown, the IOMC 257 is configured with a data packet control component 540. In this embodiment, the predefined path information 525 represents a path from the respective switch module through the distributed switch to the IOMC 257, and is transmitted to each of the sub-switches $254_{1-2}$ and the spine switch module 410 by the data packet control component 540. For example, the data packet control component 540 could determine a path from each of the sub-switches $254_{1-2}$ and spine switch module 410 back to the IOMC 257. For example, the data packet control component 540 could express the path in terms of a port number (e.g., corresponding to one of the ports $530_{1-3}$) at the respective switch module and at each of the intermediary switch modules between the respective switch module and the IOMC 257. For example, the data packet control component 540 could determine that the path from the sub-switch $254_2$ to the IOMC involves the port with port identifier "5" on the sub-switch $254_2$, the port with port identifier "1" on the spine switch module 410, and the port with port identifier "5" on the sub-switch $254_1$. The data packet control component 540 could store this path, for example, using the string "5, 1, 5", and could transmit this path information to the sub-switch $254_2$ as the predefined path information $525_3$. Of course, it is broadly contemplated that the path information may be expressed in any variety of other formats, and this example is provided without limitation and for illustrative purposes only.

The data packet control component $520_3$ may then use the predefined path information $525_3$ to transmit data packets to the IOMC 257. Generally, the data packets may be used for any communications between the sub-switch $254_2$ and the IOMC 257. For example, the data packet control component $520_3$ could generate data packets containing a notification that a particular event has occurred. The data packet control component $520_3$ could then insert the predefined path information $525_3$ that was received from the data packet control component 540 into a header portion of the generated data packets. The data packet control component $520_3$ could then use the predefined path information $525_3$ to determine which of the ports $530_3$ to transmit the packets on. Continuing the example above of the path information specifying the string "5, 1, 5", the data packet control component $520_3$ could determine that it is the first switch module in the path and could this path position information as an index to select one of the ports in the string "5, 1, 5". Thus, the data packet control component $520_3$ could determine that the port having a port identifier of "5" should be used, and could then transmit the generated data packets over this port.

The data packets could be received by the data packet component $520_2$. The data packet component $520_2$ could process the path information within the header portion of the data packets and could determine that the spine switch module 410 is not the destination for the packet, but rather is the second hop along the path to the destination. For instance, the header information within the data packets could also contain a hop counter value that could be incremented at each hop along the path. As such, the data packet component $520_2$ could use this path position information as an index to select one of the ports specified in the path information within the header portion of the data packets. Thus, continuing the above example, the data packet component $520_2$ could determine that the second value in the string "5, 1, 5" is "1". Thus, the data packet component $520_2$ could determine that the received data packets should be forwarded on the port on the spine switch module 410 having a port identifier of "1", and could forward the data packets accordingly (e.g., in addition to incrementing the hop counter value within the data packets).

Similarly, the data packets could then be received by the data packet component $520_1$, and the data packet component $520_1$ could in turn determine that the sub-switch $254_1$ is not the destination for the packets but rather is the third hop along the path to the destination. Accordingly, the data packet component $520_1$ could access the third port within the path information specified in the header portion of the data packets, and could determine that the port on the sub-switch $254_1$ having a port identifier of "5" should be used. The data packet component $520_1$ could then forward the data packets using the port with an identifier of "5". As discussed above, the data packet component $520_1$ could also increment a hop counter value within the data packets.

The data packet control component 540 could then receive the data packets and could determine that the IOMC 257 is the destination for the data packets. For example, the data packet control component 540 could access the path information within the data packets using the hop counter value within the data packets as an index, and could determine that because the port listing of "5, 1, 5" does not contain a fourth port value, the current switch module is the packet's destination. Accordingly, the data packet control component 540 could process the payload of the packet. Thus, for example, if the packet(s) contain a notification message, the data packet control component 540 could extract the notification message from the data packets and process it accordingly (e.g., by generating a log entry, by notifying an administrator, etc.). In some situations, the data packet(s) may contain a set of load/store operations. In such a scenario, the data packet control component 540 could copy the load/store operations into an execution buffer on the IOMC 257, for execution by a DRLS component on the IOMC 257.

Advantageously, by forwarding the data packets in the aforementioned way, the switch modules (e.g., the sub-switches $254_{1-2}$ and the spine switch module 410) can communicate with the IOMC 257, regardless of whether layer 2 network communication has been configured for the Ethernet ports $530_{1-3}$. That is, because embodiments use a communications protocol for passing the data packets that is separate from normal layer 2 communications over the Ethernet links, embodiments may transmit data packets even when the layer 2 communications have not yet been initialized within the distributed switch. For example, in the above example of the sub-switch $254_2$ transmitting a data packet containing a notification to the IOMC 257, the notification could specify that layer 2 communications on the sub-switch $254_2$ failed to initialize. As embodiments are not reliant on layer 2 Ethernet communications but instead use a different protocol for transmitting data packets within the distributed switch, embodiments can transmit the notification to the IOMC 257 even when the layer 2 communications on the sub-switch $254_2$ failed to initialize. In one embodiment, embodiments are configured to use a separate communications link (e.g., a proprietary iLink configured for inter-switch communications within the distributed switch) to transmit the data packet from the source to the destination.

In one embodiment, the data packet component $510_1$ is configured to notify the IOMC 257 of the data packet and to provide the data packet to the IOMC 257, without requiring the IOMC 257 to inspect the path information within the data packet and determine that the IOMC 257 is the destination of the data packet. For example, a main register partition on one of the sub-switch modules could detect the event and could react by writing to an ASYNC NOTIFY register within the DRLS component 510. For instance, the main register partition could write data that is subsequently used as payload data that is forwarded to a remote one of the sub-switch modules. The DRLS component 510 could detect that data has been written to the ASYNC NOTIFY register and could insert a request to transmit the written data into a queue of DRLS operations. A master sequencer within the DRLS component 510 could detect the queued request and could advance from an IDLE_STATE to an ASYNC_BUILD_STATE. As a result of doing so, the master sequencer could retrieve the predefined path information and could insert this path information into a header of a newly created message. Additionally, the master sequencer could insert the data written into the ASYNC NOTIFY register into the payload of the message. In one embodiment, the newly created message is built within the execution buffer 515 of the DRLS component 510. The master sequencer could then advance to an ILS_WrRsp_STATE, in which the master sequencer writes the message to an ILINK send buffer for one of the links of the sub-switch module. As a result of doing so, the message could then be written across the outgoing link, and the master sequencer could return to an IDLE_STATE.

The message could then be received at a second sub-switch module by an I-Link Receive (ILR) partition. The ILR partition could then notify the DRLS component 510 on the second sub-switch module of the received packet. In response, the DRLS component 510 could insert the ILR's notification into a queue of DRLS operations. At some point, a master sequencer for the DRLS component 510 could detect the queued notification and could advance from an IDLE_STATE to an ILR_RdReq_STATE. Additionally, the master sequencer could examine the notification and could determine that the current sub-switch is a "hop" for the request. As a result, an ILR Read Request sequencer could pull the message over a register ring from the ILR receive buffer in the ILR partition and could place the request into the DRLS execution buffer 515, at which point the master sequencer begins processing the notification. The master sequencer could then advance to an ILS_WrRsp_STATE, where the master sequencer writes the message to an JUNK send buffer for one of the outgoing links of the sub-switch module. As a result of doing so, the message could then be written across the outgoing link, and the master sequencer could return to the IDLE_STATE.

This could continue until the message reaches the sub-switch module connected to the IOMC, which in this example is the final destination of the message. The message could be received at an ILR partition (e.g., in an ILR receive buffer)

and the ILR partition could notify the DRLS component 510 of the received message. The DRLS component 510 could then determine that the current sub-switch module is the final destination for the message (e.g., based on a hop counter value within the message being equal to "0", in an embodiment where the hop counter value is decremented as it flows from its source to its destination within the distributed switch). Accordingly, the DRLS component 510 could insert the message from the ILR partition into a queue of DRLS operations. The DRLS master sequencer could then detect the queued message and could advance from an IDLE_STATE to an ILR_RdReq_STATE. An ILR Read Request Sequencer pulls the packet over a register ring on the sub-switch module, from the ILR receive buffer, and places the message into the DRLS execution buffer 515. The DRLS component 510 could then determine that the message is an AsyncNotify message that has arrived at its final destination, and could advance to an ASYNC_POST STATE. The DRLS component 510 could then notify the IOMC of the message. For example, the DRLS component 510 could signal that the message is awaiting processing by the IOMC using a bit in a status register that is pollable by the IOMC. As another example, where Ethernet links between the sub-switch module and the IOMC are operational, the DRLS component 510 could write the message to the IOMC in the form of an Ethernet packet using an Interrupt/AsyncNotify format.

Figure 6:
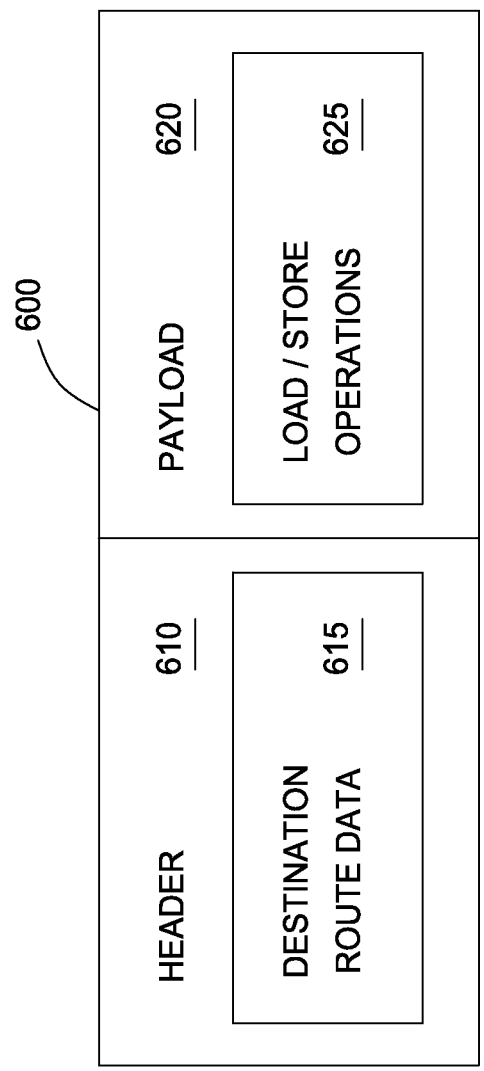
FIG. 6 illustrates a packet containing route data and a set of load/store operations, according to one embodiment described herein.

FIG. 6 illustrates a data packet 600 containing a header portion 610 and a payload portion 620. The header portion 610 contains destination route data 615. As discussed above, logic (e.g., the data packet control component 540 on the IOMC 257) could determine and transmit path information to a source switch module (e.g., the sub-switch $254_2$) within the distributed switch. Logic on the source switch module could then, when generating the data packet 600, insert the received destination route data 615 into the header portion 610 of the data packet. As discussed above, in one embodiment, the path information comprises a listing of port identifiers (e.g., "5, 1, 5") and a hop counter value. In such an embodiment, the listing of port identifiers could be used by the source switch module and the intermediary switch modules between the source switch module and the destination. Additionally, the hop counter value generally represents an index value into the list of port identifiers. For example, the hop counter value could be initialized to a value of "1", indicating that the first switch module along the path should use the first port in the list of port identifiers in forwarding the data packet, and each switch module along the path could be configured to increment the hop counter value before forwarding the data packet(s) on to the next switch module in the path. Thus, the second switch module could receive the data packet with a hop counter value of "2" (i.e., since the initial value of "1" was incremented by the source switch module), indicating the second port within the list of port identifiers should be used in forwarding the data packet.

Generally, the payload portion 620 of the data packet 600 contains data to be processed by the destination module. For instance, the payload portion 620 could include notification information, indicative of an occurrence of some predefined event. Upon detecting the predefined event has occurred, logic on the source switch module could create the data packet 600 containing the predefined path information 615 and the corresponding notification, and could transmit the data packet to another switch module within the distributed switch, using the appropriate port identifier specified in the path information 615. As an example, if the path information specifies the path of "5, 1, 5", the logic on the source switch module could transmit the data packet on the Ethernet link having an identifier of "5".

Figure 7:
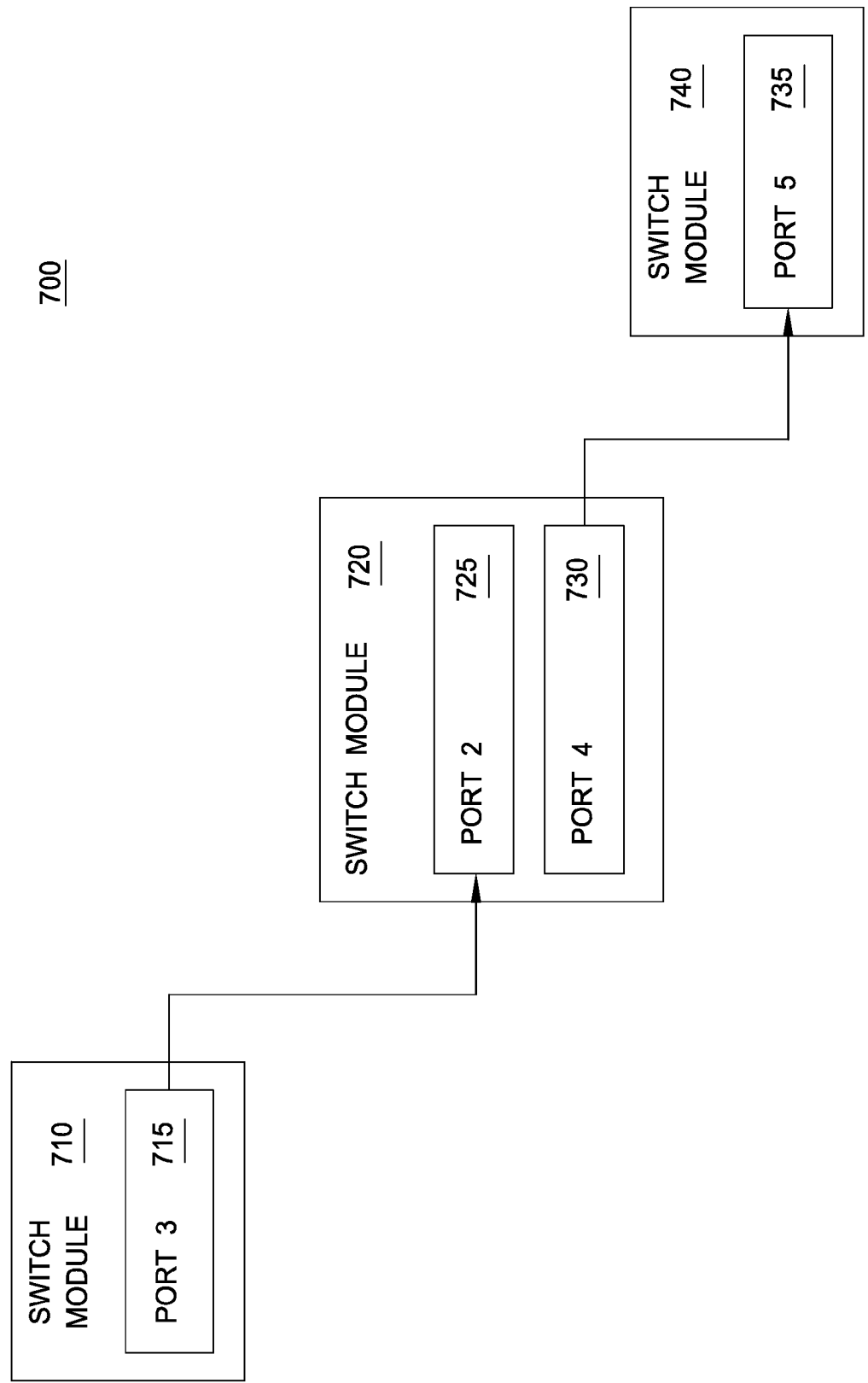
FIG. 7 illustrates a flow of a packet through a series of switch modules, according to one embodiment described herein.

FIG. 7 illustrates a flow of a packet through a series of switch modules, according to one embodiment described herein. As shown, the system 700 includes switch modules 710, 720 and 740. For purposes of this example, assume that the switch module 740 has previously determined a path through the distributed switch from the switch module 710 back to the switch module 740 (e.g., expressed using a listing of link identifiers "3, 4"), and has transmitted this path information to the switch module 710. Further assume that a data packet component 520 on the switch module 710 has detected that layer 2 network communications on one or more Ethernet links on the switch module 710 have failed to initialize.

In response to detecting the Ethernet links have failed to initialize, the data packet component 520 could create a data packet containing a notification message specifying which link(s) did not initialize properly. The data packet component 520 could then insert the received path information into a header portion of the created data packet. The data packet component 520 could also insert a hop counter value into the header portion of the data packet. For instance, in addition to inserting the listing of link identifiers "3, 4", the data packet component 520 could also insert a hop counter value of "1" into the data packet, indicating that the switch module 710 should transmit the data packet using the first link identifier within the listing. As discussed above, the hop counter value could be used to determine which of the link identifiers each switch module along the path should use to forward the data packet. Thus, in this example, the data packet component 520 could determine that the first link identifier of "3" should be used, and could transmit the data packet using the Ethernet port 3 715. Additionally, before transmitting the data packet, the data packet component 520 on the switch module 710 could increment the hop counter value to "2", so that the next switch module in the path (i.e., the switch module 720) can identify the appropriate value within the listing of port identifiers to use in forwarding the data packets.

As shown, the data packet is then received on the Ethernet port 2 725 on the switch module 720. A data packet component 520 on the switch module 720 could then determine whether the switch module 720 is the destination of the data packet. For example, the data packet component 520 could use the hop counter value within the data packet as an index into the listing of port identifiers within the data packet, and could determine whether a value exists at the position corresponding to the hop counter value within the listing of port identifiers. Thus, in this example, the data packet component 520 on the switch module 720 could determine that the hop counter value indicates the second value within the listing of port identifiers should be used, and thus could determine that the data packet should be forwarded on the link 730 having a port identifier of "4".

Figure 8:
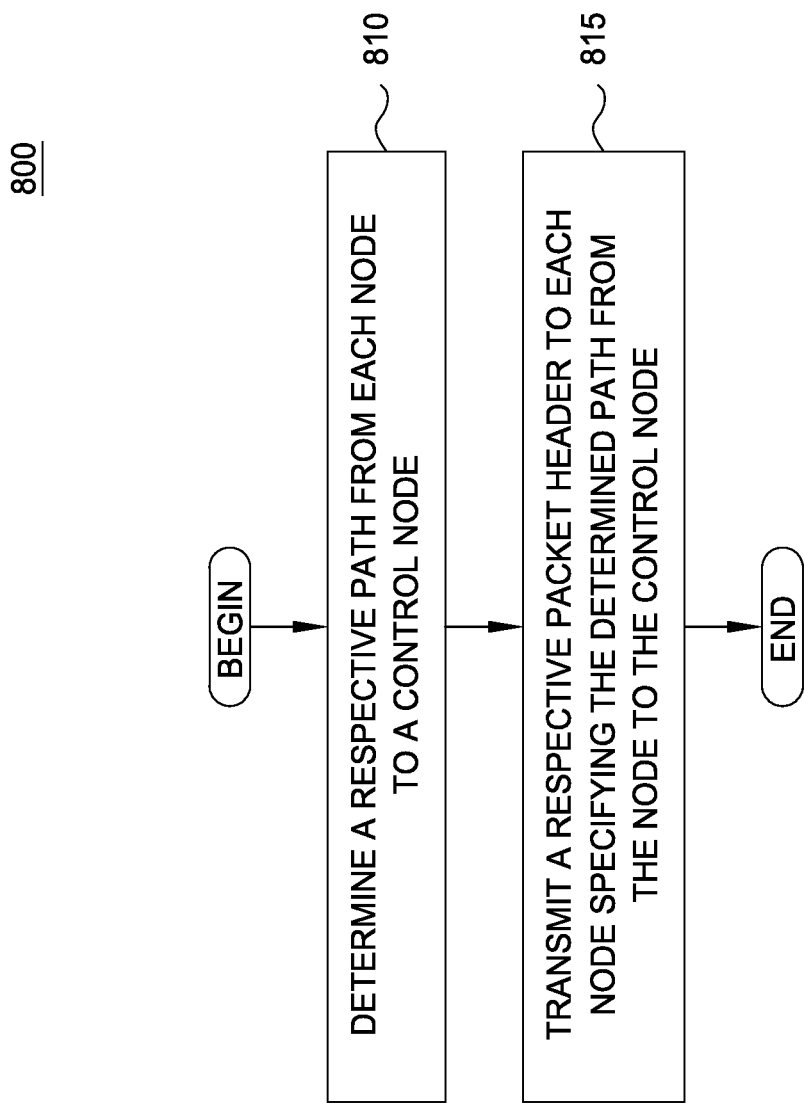
FIG. 8 is a flow diagram illustrating a method for transmitting packet headers to switch modules in a distributed switch, according to one embodiment described herein.

FIG. 8 is a flow diagram illustrating a method for transmitting packet headers to switch modules in a distributed switch, according to one embodiment described herein. As shown, the method 800 begins at block 810, where the data packet control component 540 determines a respective path from each switch module in the distributed switch to a control node of the distributed switch (e.g., the IOMC 257). For instance, the data packet control component 540 could be configured to dynamically determine a network topology of the distributed switch module, and could determine the paths from the individual switch modules back to the control node based on the determined topology. In one embodiment, the data packet control component 540 is preconfigured (e.g., by a system administrator) with the network topology and/or the path information. As discussed above, the path through the switch module could be expressed as a list of Ethernet link identifiers, where each identifier in the list corresponds to a different hop along a path through the switch module. Once the paths are determined, the data packet control component 540 then transmits a respective data packet header containing the path information to each of the switch modules within the distributed switch, and the method 800 ends.

Figure 9:
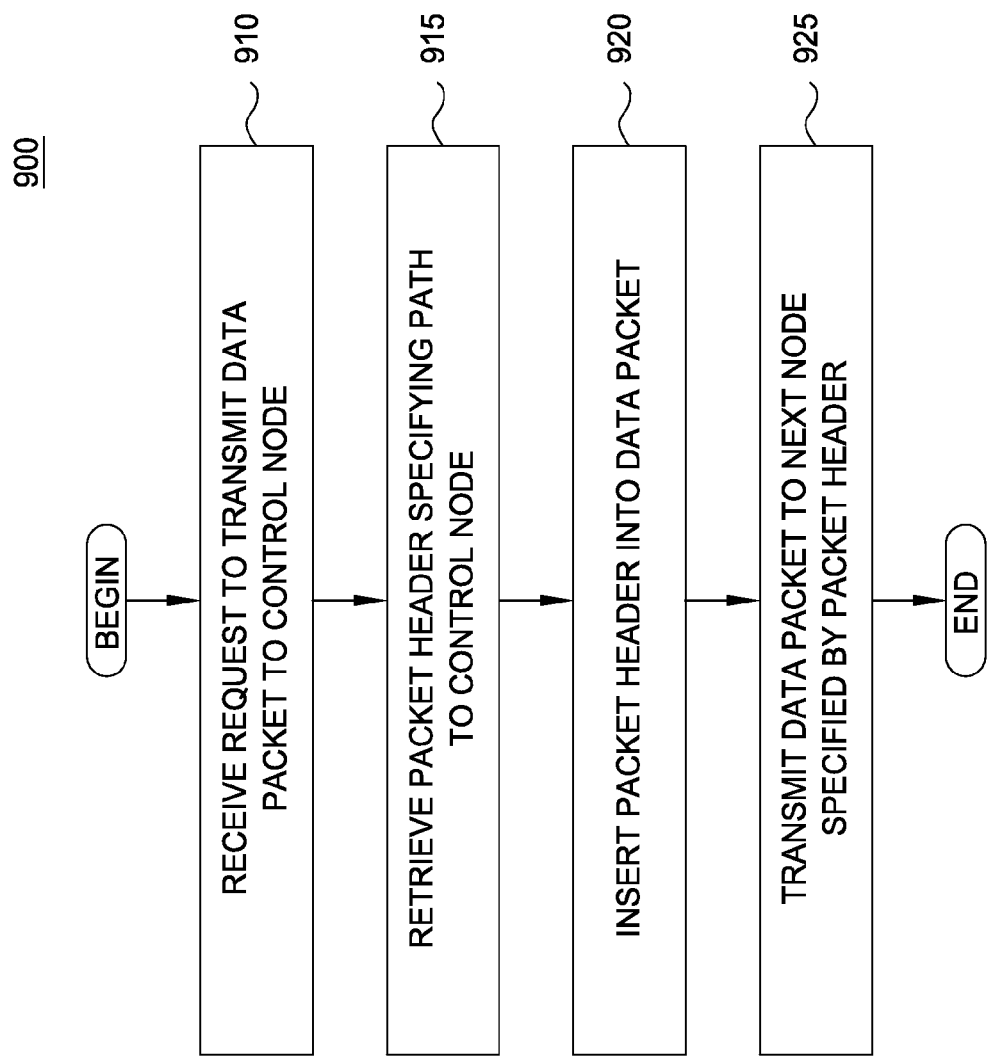
FIG. 9 is a flow diagram illustrating a method for transmitting a packet containing a predefined packet header, according to one embodiment described herein.

FIG. 9 is a flow diagram illustrating a method for transmitting a packet containing a predefined packet header, according to one embodiment described herein. As shown, the method 900 begins at block 910, where a data packet component 520 on a particular switch module within the distributed switch receives a request to transmit a data packet to the control node. Generally, the data packet can be transmitted for any number of different reasons. For example, logic on the switch module could detect that a particular event has occurred, and responsive to the occurrence of the event, could request that a data packet specifying the event (e.g., using an event identifier) be generated and transmitted to the control node, in order to notify the control node of the occurrence of the event. As another example, logic on the switch module could be configured to transmit log messages to the control node using data packets. More generally, it is broadly contemplated that the data packets can be created for any reason and can include any type of data, consistent with the functionality described herein.

Upon receiving the request, the data packet component 520 on the switch module retrieves packet header information that specifies a path through the distributed switch to the control node (block 915). For example, the path header information could have been transmitted to the switch module by the data packet control component 540 on the control node, using the aforementioned method 800. The data packet component 520 then generates a data packet based on the request, and inserts the retrieved packet header into the generated data packet (block 920). The data packet component 520 could also be configured to insert a hop counter value in the packet. As discussed above, the hop counter value could be incremented at each hop along the path through the distributed switch, and could be used by the various switch modules along the path as an index into the path information in the packet header. Advantageously, doing so enables each switch module along the path to access the appropriate Ethernet link identifier within the listing in the packet header.

The data packet component 520 then transmits the data packet using the Ethernet link identifier specified in the retrieved packet header (block 925), and the method 900 ends. As discussed above, although the data packet is transmitted over an Ethernet link within the distributed switch, the data packet may not conform to standard layer 2 Ethernet communication standards, but instead could be expressed using a separate and distinct communications protocol. Advantageously, doing so allows the data packet to be transmitted through the distributed switch, even when layer 2 communications for the various Ethernet links are inoperable (e.g., before the layer 2 communication services have been initialized).

Figure 10:
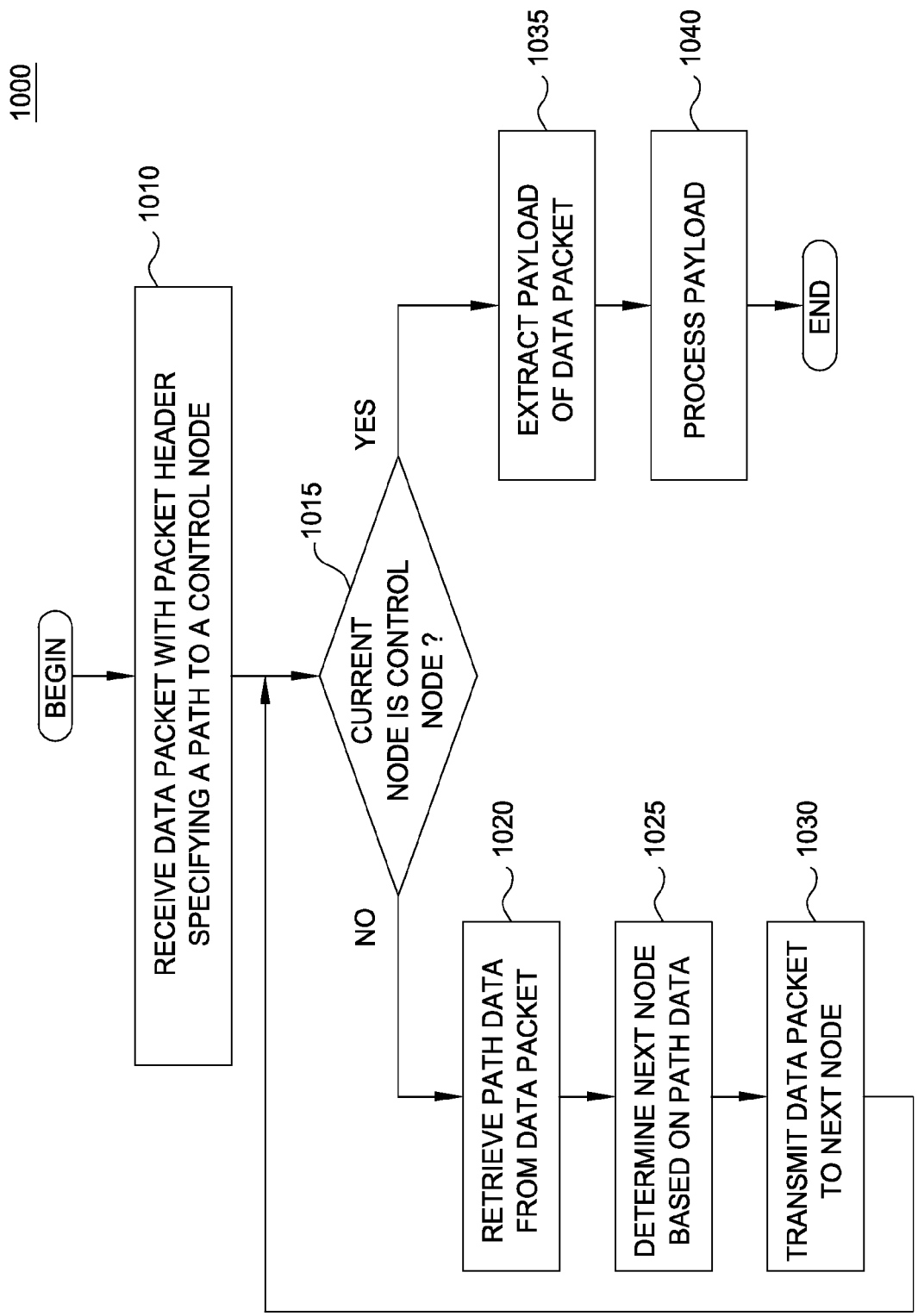
FIG. 10 is a flow diagram illustrating a method for transmitting a packet to a control node, according to one embodiment described herein.

FIG. 10 is a flow diagram illustrating a method for transmitting a packet to a control node, according to one embodiment described herein. As shown, the method 1000 begins at block 1010, where the data packet component 520 on a switch module within the distributed switch receives a data packet containing a packet header that specifies a path to a destination node within the distributed switch (i.e., the control node in this example). Of note, although examples herein are used to transmit data packets to a control node of a distributed switch, it is broadly contemplated that the techniques described herein can be used to generate network messages to any sort of network device and in a variety of different contexts, consistent with the functionality described herein.

Upon receiving the data packet, the data packet component 520 then determines whether the current switch module is the destination node for the received packet (block 1015). For example, the data packet component 520 could use a hop counter value within the received data packet as an index into a listing of link identifiers within the packet header, and if the hop counter value corresponds to a link identifier within the listing, the data packet component 520 could determine that the current switch module is not the destination of the packet. In such a scenario, the data packet component 520 could retrieve the path data from the data packet (block 1020) and could determine how to transmit the data packet on towards the next node in the path, based on the retrieved path data (block 1025). For example, if the data packet component 520, using the hop counter value as an index, retrieves a link identifier from the listing of link identifiers within the path information, the data packet component 520 could determine that the data packet should be transmitted on towards the destination using the retrieved link identifier. At block 1030, the data packet component 520 then transmits the data packet towards the next node in the path (e.g., by transmitting the data packet over the Ethernet link of the switch module that corresponds to the determined link identifier). The method 1000 then returns to block 1015, where the next node in the path determines whether it is the destination node for the data packet.

If instead the data packet component 520 on the current switch module determines that the current switch module is the destination for the data packet, the data packet component 520 then extracts the payload information from the data packet (block 1035) and processes the payload information (block 1040), and the method 1000 ends. As discussed above, the payload information within the data packet can contain log information, an error notification, an event notification, performance data, and so on. More generally, it is broadly contemplated that any data may be contained within the payload of the data packet, consistent with the functionality described herein. Advantageously, by using the techniques described herein, embodiments allow data packets to be transmitted over the Ethernet links of a distributed switch, separate and independent from any layer 2 data communications over the Ethernet links.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of transmitting a packet from a source switch module to a destination switch module, comprising:
    receiving, at the source switch module, from the destination switch module, an ordered listing of Ethernet link identifies specifying a path for transmitting packets from the source switch module to the destination switch module;
    upon detecting an occurrence of a predefined event, generating a packet that includes (i) the received ordered listing of Ethernet link identifiers, (ii) a second ordered listing of Ethernet link identifiers, specifying a return path for transmitting data packets from the destination switch module to the source switch module, and (iii) a set of load/store operations to be executed by the destination switch module, wherein an intermediary switch module along the path from the source switch module to the destination switch module is configured to modify the packet by inserting an Ethernet link identifier into the second portion of the packet, the Ethernet link identifier corresponding to a determined incoming Ethernet port on which the intermediary switch module received the packet;
    determining an Ethernet port of the source switch module on which to transmit the packet, by selecting one of the ordered listing of Ethernet link identifiers;
    transmitting the packet towards the destination switch module using the determined Ethernet port, wherein the destination switch module is configured to copy the set of load/store operations into an execution buffer for automatic execution; and
    once the set of load/store operations have been executed by the destination switch module, receiving, at the source switch module, from the destination switch module, a response packet that includes (i) the second ordered listing of Ethernet link identifiers specifying the return path from the destination switch module to the source switch module and (ii) payload data to be processed at the source switch module.

2. The method of claim 1, wherein the packet includes a hop counter value, configured to be incremented at each hop along the path from the source switch module to the destination switch module.

3. The method of claim 2, wherein the hop counter value is used as an index in selecting one of the Ethernet link identifiers from the ordered listing of Ethernet link identifiers.

4. The method of claim 3, further comprising:
    incrementing the hop counter value within the packet, before transmitting the packet to the second switch module.

5. The method of claim 1, wherein the payload data comprises an event identifier corresponding to the first event.

6. The method of claim 1, wherein each of the Ethernet link identifiers within the ordered listing of Ethernet link identifiers corresponds to a respective hop along the path from the source switch module to the destination switch module.

7. A non-transitory computer-readable medium containing computer-readable program code that, when executed, performs an operation for transmitting a packet from a source switch module to a destination switch module, comprising:
    receiving, at the source switch module, from the destination switch module, an ordered listing of Ethernet link identifies specifying a path for transmitting packets from the source switch module to the destination switch module;
    upon detecting an occurrence of a predefined event, generating a packet that includes (i) the received ordered listing of Ethernet link identifiers, (ii) a second ordered listing of Ethernet link identifiers, specifying a return path for transmitting data packets from the destination switch module to the source switch module, and (iii) a set of load/store operations to be executed by the destination switch module, wherein an intermediary switch module along the path from the source switch module to the destination switch module is configured to modify the packet by inserting an Ethernet link identifier into the second portion of the packet, the Ethernet link identifier corresponding to a determined incoming Ethernet port on which the intermediary switch module received the packet;
    determining an Ethernet port of the source switch module on which to transmit the packet, by selecting one of the ordered listing of Ethernet link identifiers;
    transmitting the packet towards the destination switch module using the determined Ethernet port, wherein the destination switch module is configured to copy the set of load/store operations into an execution buffer for automatic execution; and
    once the set of load/store operations have been executed by the destination switch module, receiving, at the source switch module, from the destination switch module, a response packet that includes (i) the second ordered listing of Ethernet link identifiers specifying the return path from the destination switch module to the source switch module and (ii) payload data to be processed at the source switch module.

8. The non-transitory computer-readable medium of claim 7, wherein the packet includes a hop counter value, configured to be incremented at each hop along the path from the source switch module to the destination switch module.

9. The non-transitory computer-readable medium of claim 8, wherein determining the Ethernet port of the source switch module further comprises:
    selecting an Ethernet link identifier from an ordered listing of link identifiers, using the hop counter value as an index.

10. The non-transitory computer-readable medium of claim 9, the operation further comprising:
    incrementing the hop counter value within the packet, before transmitting the packet to the second switch module.

11. The non-transitory computer-readable medium of claim 7, wherein the payload data comprises an event identifier corresponding to the first event.

12. The non-transitory computer-readable medium of claim 7, wherein each of the Ethernet link identifiers within the ordered listing of Ethernet link identifiers corresponds to a respective hop along the path from the source switch module to the destination switch module.

13. A system, comprising:
a processor; and
a memory containing a program that, when executed by the processor, performs an operation for transmitting a packet from a source switch module to a destination switch module, comprising:
receiving, at the source switch module, from the destination switch module, an ordered listing of Ethernet link identifies specifying a path for transmitting packets from the source switch module to the destination switch module;
upon detecting an occurrence of a predefined event, generating a packet that includes (i) the received ordered listing of Ethernet link identifiers, (ii) a second ordered listing of Ethernet link identifiers, specifying a return path for transmitting data packets from the destination switch module to the source switch module, and (iii) a set of load/store operations to be executed by the destination switch module, wherein an intermediary switch module along the path from the source switch module to the destination switch module is configured to modify the packet by inserting an Ethernet link identifier into the second portion of the packet, the Ethernet link identifier corresponding to a determined incoming Ethernet port on which the intermediary switch module received the packet;
determining an Ethernet port of the source switch module on which to transmit the packet, by selecting one of the ordered listing of Ethernet link identifiers;
transmitting the packet towards the destination switch module using the determined Ethernet port, wherein the destination switch module is configured to copy the set of load/store operations into an execution buffer for automatic execution; and
once the set of load/store operations have been executed by the destination switch module, receiving, at the source switch module, from the destination switch module, a response packet that includes (i) the second ordered listing of Ethernet link identifiers specifying the return path from the destination switch module to the source switch module and (ii) payload data to be processed at the source switch module.

14. The system of claim 13, wherein the packet includes a hop counter value, configured to be incremented at each hop along the path from the source switch module to the destination switch module.

15. The system of claim 14, wherein determining the Ethernet port of the source switch module further comprises:
selecting an Ethernet link identifier from an ordered listing of link identifiers, using the hop counter value as an index.

16. The system of claim 15, the operation further comprising:
incrementing the hop counter value within the packet, before transmitting the packet to the second switch module.

17. The system of claim 13, wherein the payload data comprises an event identifier corresponding to the first event.

18. The system of claim 13, wherein each of the Ethernet link identifiers within the ordered listing of Ethernet link identifiers corresponds to a respective hop along the path from the source switch module to the destination switch module.

* * * * *